(12) United States Patent
Griffin et al.

(10) Patent No.: US 6,315,094 B1
(45) Date of Patent: Nov. 13, 2001

(54) PASSIVE VIRTUAL SKYHOOK VIBRATION ISOLATION SYSTEM

(75) Inventors: Steven Griffin; Joel Gussy; Steven A. Lane; Benjamin K. Henderson; Dino Sciulli, all of Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/574,801

(22) Filed: May 19, 2000

(51) Int. Cl.[7] ........................................................ F16F 7/10
(52) U.S. Cl. ...................................... 188/379; 267/140.11
(58) Field of Search .................................. 188/379, 380, 188/378, 299.1; 267/136, 195, 174, 292, 140.11, 140.12, 141.2; 280/124.1, 124.108; 248/550, 560, 562, 636, 638

(56) References Cited

U.S. PATENT DOCUMENTS

| | | | | |
|---|---|---|---|---|
| 3,807,678 | * | 4/1974 | Karnopp et al. | 248/358 R |
| 5,199,737 | * | 4/1993 | Huang | 280/124.1 |
| 5,295,705 | * | 3/1994 | Butsuen et al. | 188/299.1 |
| 5,558,191 | | 9/1996 | Lai | 188/379 |
| 6,135,390 | * | 10/2000 | Sciulli et al. | 244/158 R |

FOREIGN PATENT DOCUMENTS

4241249-A1  *  6/1993 (DE) .

OTHER PUBLICATIONS

Karnopp, D., Crosby, M. J., Harwood, R. A., Vibration Control Using Semi–Active Force Generators, *J. of Engineering for Industry*, 96, pp. 619–626, 1974.

Fuller, C. R., Elliott, S. J., and Nelson, P. A., *Active Control of Vibration*, Academic Press, New York, 1996.

Rakheja, S., "Vibration and Shock Isolation Performance of a Semi–Active 'On–Off' Damper," *J. of Vibration Acoustics, Stress, and Reliability in Design*, 107, pp. 398–403, 1985.

* cited by examiner

*Primary Examiner*—Pam Rodriguez
(74) *Attorney, Agent, or Firm*—Kenneth E. Callahan

(57) ABSTRACT

A virtual sky hook vibration isolation system provides reduction of transmissibility at resonance without significantly increasing high frequency transmissibility. Isolation is achieved passively and without the need for an inertial reference frame. Design of the primary and secondary suspension systems is performed concurrently to achieve the desired performance. The primary suspension affords the necessary static deflection properties and high frequency isolation. The secondary system couples to the system at resonance and provides damping to the dynamic response. This combination yields the isolation benefits of the skyhook damper concept. The penalty for this performance is the necessity of a secondary spring-mass-damper device. However, results indicated that good performance can be achieved using a relatively small secondary mass (5% of the primary mass).

1 Claim, 9 Drawing Sheets

Virtual Skyhook Isolation System

PASSIVE VIRTUAL SKYHOOK VIBRATION ISOLATION SYSTEM

STATEMENT OF GOVERNMENT INTEREST

The invention described herein may be manufactured and used by or for the Government for governmental purposes without the payment of any royalty hereon.

BACKGROUND OF THE INVENTION

1. Field of the Invention

The present invention is in the field of vibration attenuation and isolation, and in particular, relates to a passive skyhook-type isolation system.

2. Description of the Prior Art

Isolating a structure or system from an unwanted source of vibration is a classic problem in mechanical engineering. There are many machines that benefit from vibration isolation. Common examples include automobiles, trains, heavy machinery, and most recently, spacecraft launch vehicles. One objective of vibration isolation is to reduce the vibration transmission from an external disturbance to a sensitive system. This is typically accomplished by the addition of a suspension, including spring and damper elements, which reduces the sensitive system's response to external disturbances. Isolation systems are usually designed to attenuate either shock or persistent harmonic excitations.

Design and implementation of passive isolation systems has been studied for many years. There are inherent limitations on the amount of isolation that can be provided using passive elements. Design of passive isolation systems involves a trade-off of resonant response and high-frequency attenuation. A solution referred to as a skyhook damper provides damping at resonance without increasing transmissibility at high frequencies (Karnopp, D., Crosby, M. J., Harwood, R. A., "Vibration Control Using Semi-Active Force Generators, *J of Engineering for Industry*, 96, pp. 619–626, 1974). However, skyhook damping requires that a viscous damper be connected to an inertial reference frame, which is not practical in most situations. There has been work to realize a skyhook damper actively using sensors, actuators and control electronics (Fuller, C. R., Elliott, S. J., and Nelson, P. A., *Active Control of Vibration*, Academic Press, New York, 1996). Other realizations of skyhook damping devices use semi-active approaches (Rakheja, S., "Vibration and Shock Isolation Performance of a Semi-Active 'On-Off' Damper," *J of Vibration, Acoustics, Stress, and Reliability in Design*, 107, pp. 398–403, 1985). While these studies have yielded promising results, they often introduce the need for a power source and necessarily add complexity to the isolation system.

U.S. Pat. No. 5,558,191 is a passive tuned mass damper using a secondary mass connected to the primary structure by a spring and a viscoelastic element suspension system. The suspension system is tuned to the resonant frequency of the primary structure, damping the primary structure motion by the movement of the secondary mass. The primary mass is not isolated by a spring/damping system, as in the present invention, but is rigidly connected to something (the earth) that transmits vibrations. It is designed to minimize movement at resonance, not to yield low transmissibility at frequencies above resonance.

It is an object of the present invention to present a virtual skyhook isolation system that is able to demonstrate the desired transmissibility characteristics using an entirely passive approach. Like the skyhook damper, it has the benefit of limiting vibration amplitude at resonance without increasing transmissibility at higher frequencies. This is accomplished without the need for an inertial reference frame by using a secondary tuned spring-mass-damper system. Unlike other tuned mass-damper implementations that generally provide vibration attenuation at structural resonance, the concept presented herein focuses on improved high frequency isolation characteristics along with increased damping at the primary mass resonant frequency.

SUMMARY OF THE INVENTION

The present invention is a passive isolation system that offers the performance of a skyhook damper, but without the need of an inertial reference. This "virtual skyhook" isolation system can be used to isolate a system or machine from the transfer of mechanical vibrations to or from other systems or the environment. The invention consists of two isolation systems that together provide attenuation of the response at resonance and low transmissibility above resonance. The proposed system is passive, as opposed to active, which is advantageous in many ways, including robustness of performance and no power requirements.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DESCRIPTION OF THE PREFERRED EMBODIMENT

A typical linear isolation/suspension system composed of a spring and a viscous damper is shown in FIG. 1A. In the very familiar example of a car, the springs are often a combination of metallic or fiberglass springs, and the shock absorbers constitute the damping elements. The motion of this simple system can be described by the second-order differential equation $$m_1 \ddot{x}_1(t) + c_1(\dot{x}_1(t) - \dot{z}(t)) + k_1(x_1(t) - z(t)) = 0, \qquad (1)$$

where $x_1(t)$ is the motion of the mass, $z(t)$ is the motion of the base, and $c_1$ and $k_1$ are the damping coefficient and spring-rate of the isolation system, respectively. The "displacement transmissibility" of the isolation system, denoted as $T_r$, can be determined by taking the Laplace transform of Equation (1) and solving for the amplitude ratio $|X_1(s)/Z(s)|$, which yields $$T_r(s) = \left|\frac{X_1(s)}{Z(s)}\right| = \left|\frac{2\zeta\omega_n s + \omega_n^2}{s^2 + 2\zeta\omega_n s + \omega_n^2}\right| \text{ where} \tag{2}$$

$$\omega_n = \sqrt{\frac{k_1}{m_1}} \text{ and } 2\zeta\omega_n = \frac{c_1}{m_1}. \tag{3}$$

A limiting factor that establishes a lower bound for the stiffness of the suspension is the allowable static and dynamic displacement. Displacement at resonance is usually the primary parameter of concern in isolation system design. In general, for the linear system shown in FIG. 1A with fixed mass and damper values, a more compliant spring leads to more static and dynamic displacement at low frequencies and a greater reduction in transmissibility at higher frequencies. The damping force is proportional to the relative velocity of the base and the mass, as indicated in Equation (1). The transmissibility of the system described by Equation (1) is plotted in FIG. 2 for a variety of damping ratios using fixed values of mass and stiffness. FIG. 2 shows that a damper with a higher damping ratio will limit motion at resonance, but increases transmissibility at higher frequencies. This establishes the trade-space for the linear isolation system.

Figure 2:
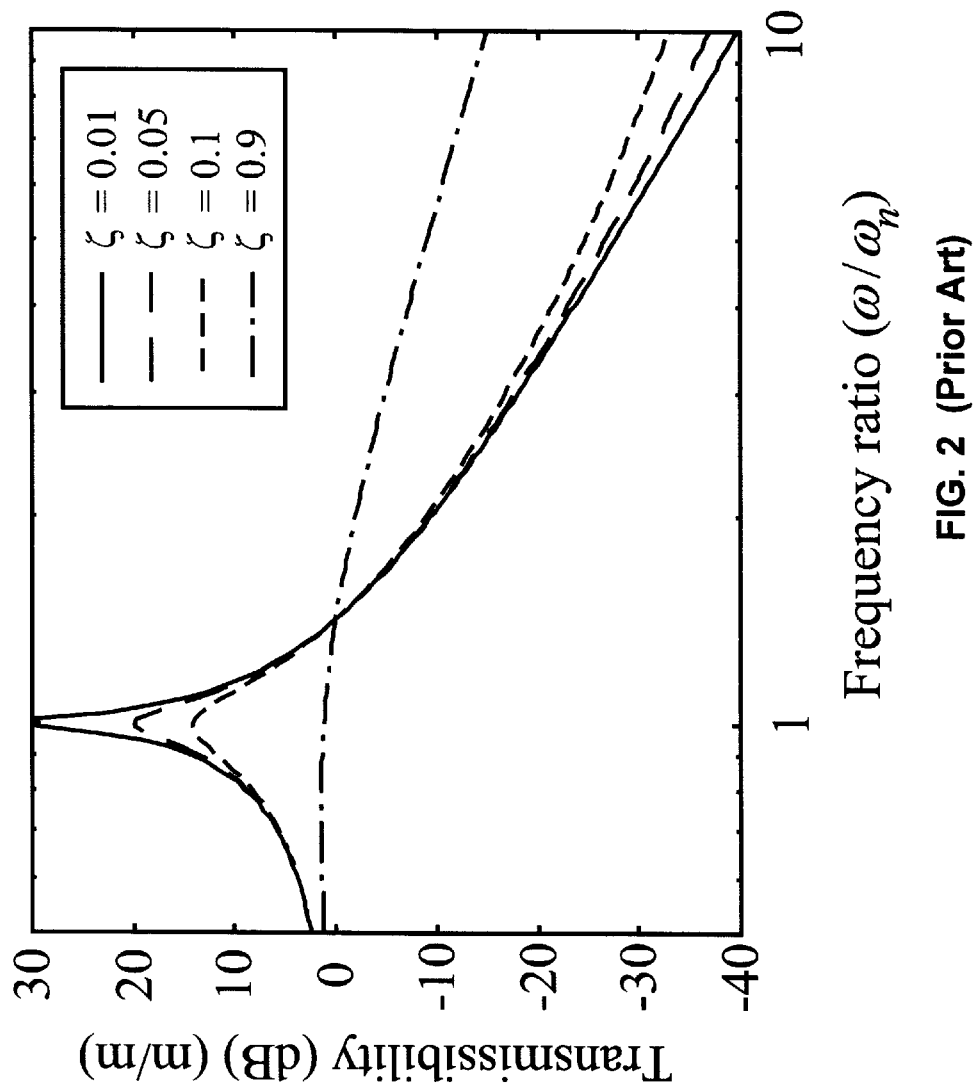
FIG. 2 is a graph of the transmissibility of a typical spring-mass-damper system with base excitation.
Figure 3:
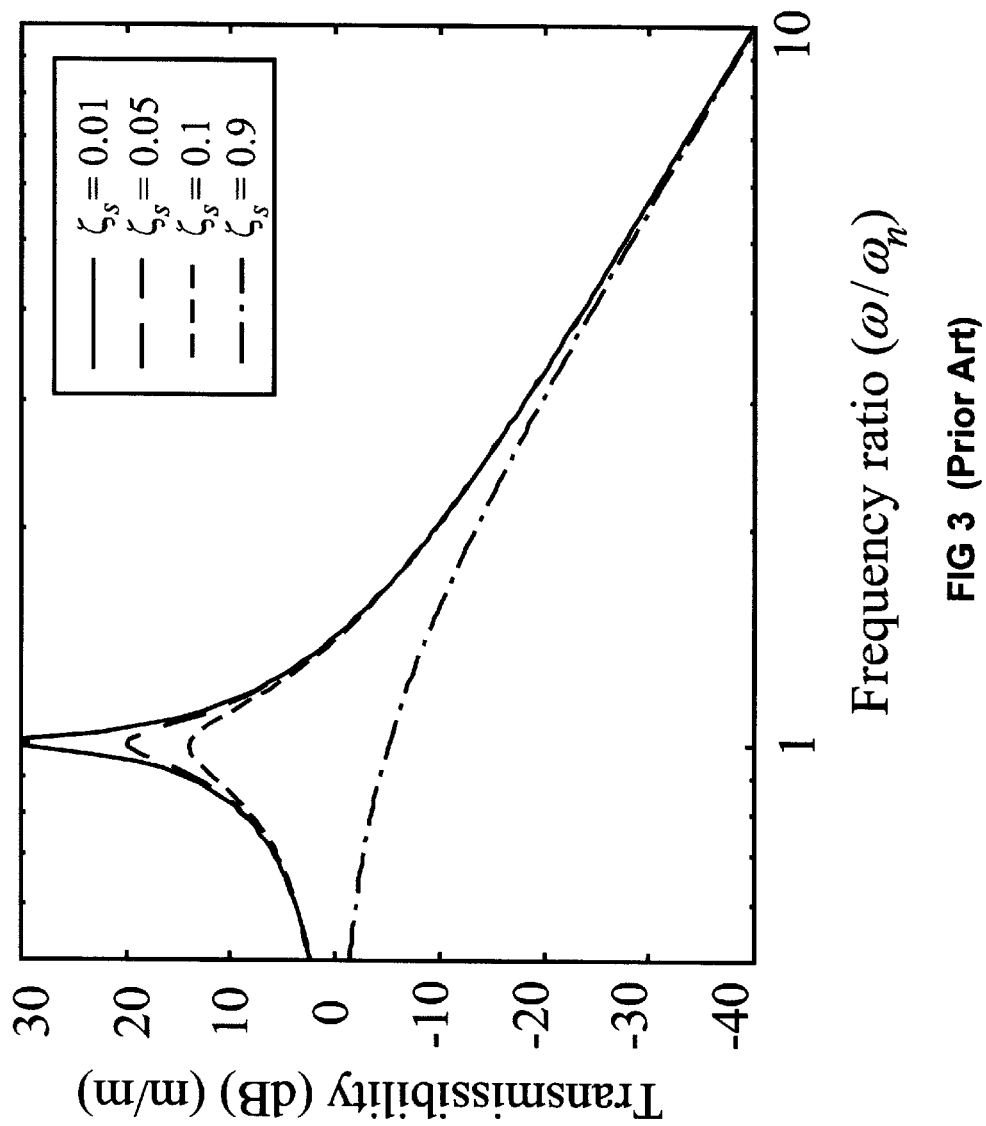
FIG. 3 is a graph of the transmissibility of an isolation system using a skyhook damper.

FIG. 1B presents the skyhook damper arrangement. The damper is connected from an inertial reference frame to the mass to be isolated as opposed to a connection from the moving surface and the mass. Therefore, the damping force is proportional to the absolute velocity of the moving mass. The transmissibility is given as $$T_r(s) = \left|\frac{\omega_n^2}{s^2 + 2\zeta_s\omega_n s + \omega_n^2}\right|, \tag{4}$$

where $\omega_n$ is defined as given in Equation (3), but $$2\zeta_s\omega_n = \frac{c_{sky}}{m_1}, \tag{5}$$

where $C_{sky}$ is the damping coefficient of the damper. The transmissibility of this system is presented in FIG. 3 for the same damping ratios used in FIG. 2. The benefit of an isolation system that provides skyhook damping is reduced motion at resonance without increased transmissibility above resonance. The difficulty of realizing a skyhook damper in a physical system is achieving an inertial reference frame that will stay in close proximity to the moving mass. In most systems, such an attachment is impractical.

Figure 4:
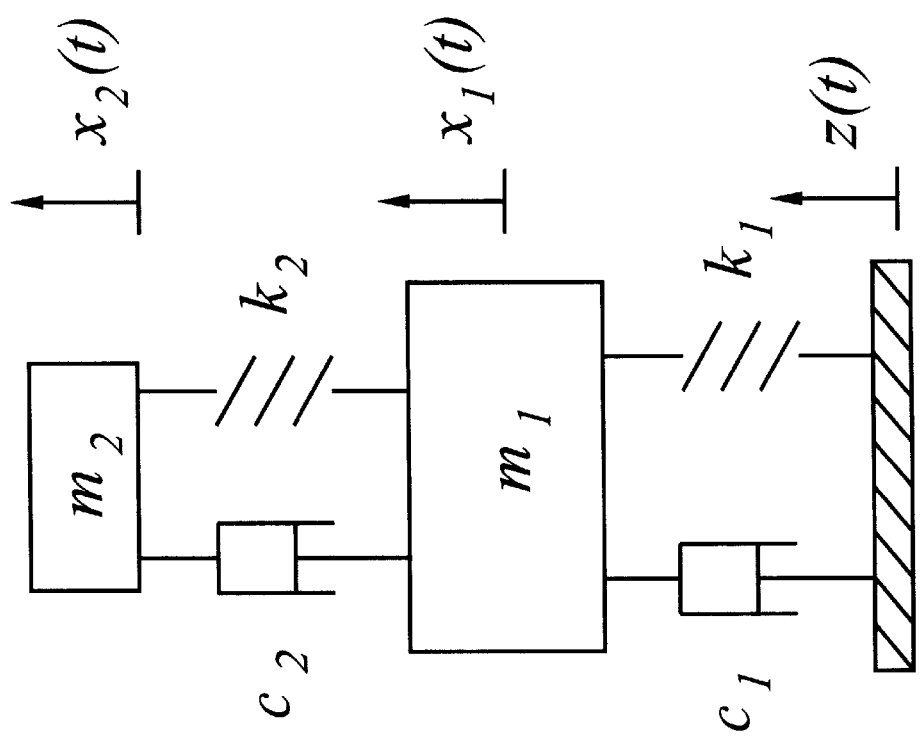
FIG. 4 is a model of the virtual skyhook isolator attached to a spring-mass-damper that is subject to base excitation.

In the virtual skyhook isolation system, a secondary spring-mass-damper is attached to the primary mass, $m_1$ that is being isolated as shown in FIG. 4. The motion of this system can be described by the following coupled differential equations, $$m_1\ddot{x}_1(t)+(c_1+c_2)\dot{x}_1(t)-c_2\dot{x}_2(t)+(k_1+k_2)x_1(t)-k_2x_2(t)=k_1z(t)+c_1\dot{z}(t) \tag{5}$$

$$m_2\ddot{x}_2(t)-c_2\dot{x}_1(t)+c_2\dot{x}_2(t)-k_2x_1(t)+k_2x_2(t)=0 \tag{6}$$

The Laplace transform of the transmissibility of this system can be expressed as $$T_r(s) = \left|\frac{\alpha_3 s^3 + \alpha_2 s^2 + \alpha_1 s + \alpha_0}{\beta_4 s^4 + \beta_3 s^3 + \beta_2 s^2 + \beta_1 s + \beta_0}\right|, \tag{7}$$

where the constants $\{\alpha\text{'s}, \beta\text{'s}\}$ in Equation (7) are dependant on the mass, stiffness, and damping parameters of the system and are defined as:

$\alpha_3 = m_2 c_1$
$\alpha_2 = m_2 k_1 + c_1 c_2$
$\alpha_1 = c_1 k_2 + c_2 k_1$
$\alpha_0 = k_1 k_2$
$\beta_4 = m_1 m_2$
$\beta_3 = c_1 m_2 + c_2 (m_1 + m_2)$
$\beta_2 = c_1 c_2 + k_1 m_2 + k_2 (m_1 + m_2)$
$\beta_1 = c_2 k_1 + c_1 k_2$
$\beta_0 = k_1 k_2$ The design and realization of the virtual skyhook damper involves the design of both the primary and secondary suspension systems to achieve the desired transmission characteristics. The primary suspension system is designed to meet static deflection criteria and uses low damping to provide low transmissibility at high frequencies. The secondary spring-mass-damper is tuned relatively close in frequency to the primary system's resonance, and is designed to have relatively high damping. This introduces a large damping contribution to the primary mass and limits its motion at resonance. However, it does not significantly increase the damping of the primary system away from resonance. This yields a lightly damped primary system whose motion is limited at resonance by the virtual skyhook damper apparatus without increased transmissibility at higher frequencies.

The acceleration transmissibility is mathematically equivalent to the displacement transmissibility and is readily measured using two accelerometers. In the subsequent experiments, a test stand was constructed and used to demonstrate the virtual skyhook isolation concept, and the results were compared to predictions computed using Equation (7). To accurately model the coupled system, the mass and stiffness added by the isolation system must be taken into account. In the experiments, damping was added using visco-elastic material, which slightly increased the stiffness and greatly increased the damping. Furthermore, the suspension springs increased the moving mass and lowered the resonance frequency.

In the subsequent simulations, the design parameters ($c_1$, $c_2$, $k_2$, and $m_2$) were optimized by minimizing a quadratic performance function based on a weighted combination of the transmissibility at resonance and the transmissibility at high frequency (taken to be ten times $\omega_{n1}$). The primary system, $m_1$ and $k_1$, which established $\omega_{n1}$, were assumed to be static variables.

The performance of the virtual skyhook isolation system can be quantified by considering the ratio of the maximum transmissibility of the initial, lightly damped suspension to the maximum transmissibility of the optimized skyhook design. This ratio is denoted as the "attenuation factor" and is given as $$\text{attenuation factor} = \frac{\max(T_r(\omega)_{initial})}{\max(T_r(\omega)_{sky})}, \tag{8}$$

where $T_r(\omega)_{sky}$ is the transmissibility with the virtual skyhook isolator as a function of frequency, and $T_r(\omega)_{initial}$ is the transmissibility of the system without the isolator, also a function of frequency. It is desired to reduce transmissibility using the virtual skyhook system, which implies maximizing the attenuation factor.

In addition, the performance of the virtual skyhook isolation system can be compared to the performance achieved using a heavily damped suspension system to demonstrate the high frequency effects on transmissibility. The ratio of the transmissibility of the optimized virtual skyhook design to the transmissibility of a damped isolation system, where the damping is sufficient to yield the same maximum transmissibility as the virtual skyhook design, is denoted as the "high frequency reduction" and is given as $$\text{high frequency reduction} = \frac{T_r(10\,\omega_n)_{sky}}{T_r(10\,\omega_n)_{damped}}, \quad (9)$$

where the transmissibility is evaluated at a frequency ten times higher than the uncoupled resonance frequency of the primary system. It is apparent that if the high frequency reduction is much less than unity, then the virtual skyhook system is yielding much lower transmissibility than an equivalently damped system.

Figure 5:
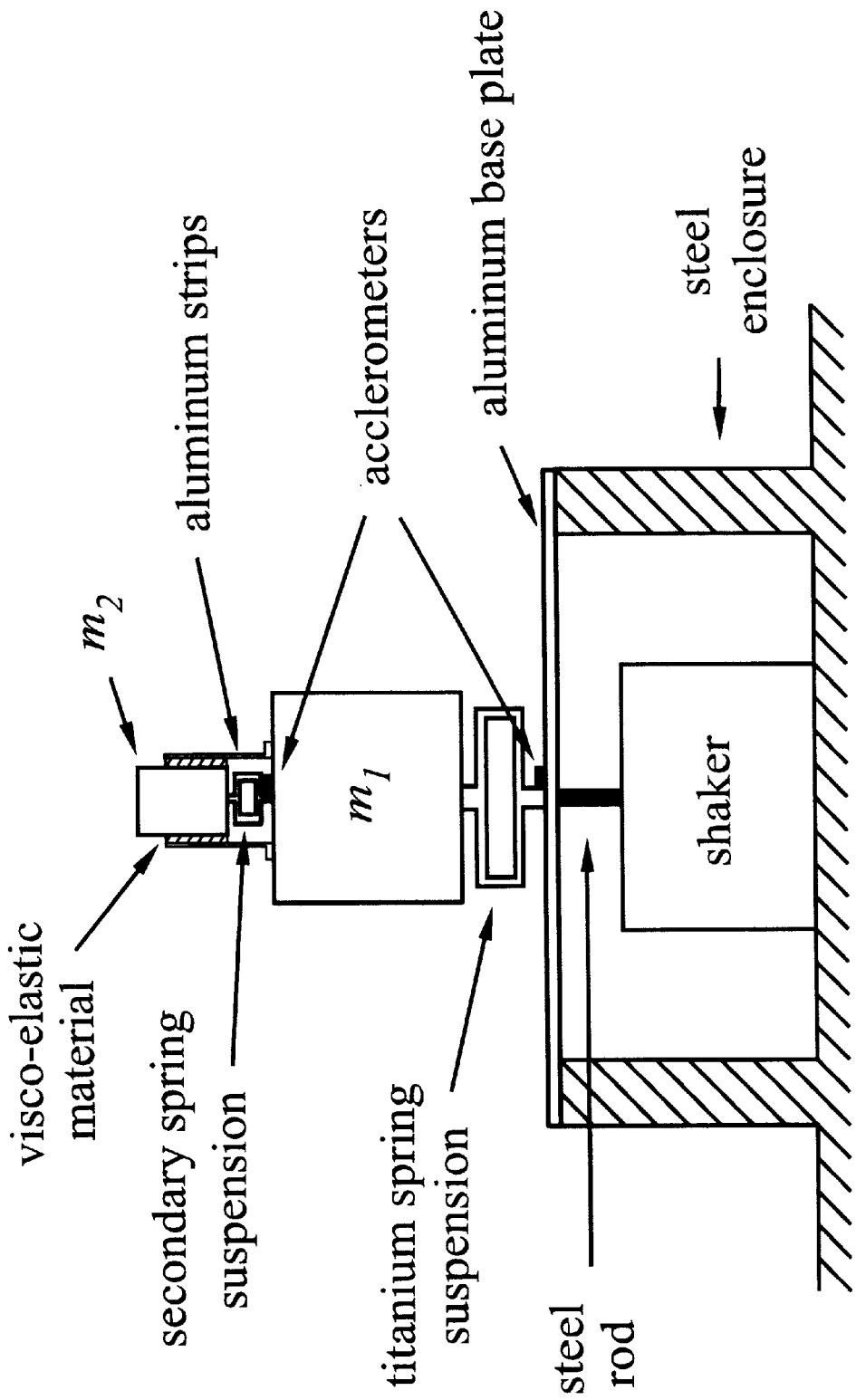
FIG. 5 is a schematic of the experimental test system used to measure the transmissibility of the virtual skyhook isolator.

A linear isolation system was constructed using the component parameters given in Table 1. A schematic of the test apparatus with the attached virtual skyhook damper apparatus is presented in FIG. 5. An electro-dynamic shaker mounted within a heavy steel support structure was connected to the center of an aluminum base-plate (50 cm×10 cm×2 cm) by a threaded steel rod. The base-plate was bolted to the support structure at its edges to approximate the boundary conditions of a moving flat base. A lightly-damped titanium spring suspension was bolted to the base-plate directly above the steel rod. The primary mass, $m_1$, was rigidly attached to the top of the titanium spring apparatus. The secondary mass, $m_2$, was mounted to a secondary spring suspension, which was similar in design to the titanium spring. Aluminum strips were rigidly attached to $m_1$, and visco-elastic material was used to attach these strips to $m_2$. Vertical motion of $m_2$ relative to $m_1$ placed the visco-elastic layer in shear, providing damping for the secondary suspension. Kistler model 8630B50 accelerometers were attached to the base-plate and the primary mass as shown in FIG. 5. A Hewlett-Packard dynamic signal analyzer was used to generate a periodic-chirp disturbance input and to measure the accelerometer outputs. The transmissibility was computed with the analyzer as the frequency response of the accelerometer signal from $m_2$ over the accelerometer signal from $m_1$.

TABLE 1

Parameters used in the virtual skyhook model and experiment.

| | |
|---|---|
| primary mass, $m_1$ | 4.6 kg |
| secondary mass, $m_2$ | 1.14 kg |
| uncoupled primary resonance frequency, $\omega_{n1}$ | 302 rad/sec (48 Hz) |
| uncoupled secondary resonance frequency, $\omega_{n2}$ | 270 rad/sec (43 Hz) |
| primary damping ratio, $\zeta_1$ | 0.004 |
| secondary damping ratio, $\zeta_2$ | 0.76 |

The natural frequency and damping parameters in Table 1 were measured using standard modal analysis methods with the exception of $\zeta_2$. Since the damping was so high and standard modal analysis methods are generally not reliable for damping ratios above 10%, $\zeta_2$ was estimated using the analytical model by adjusting the parameter until the amplitude of the model predictions matched the measured values.

Figure 6:
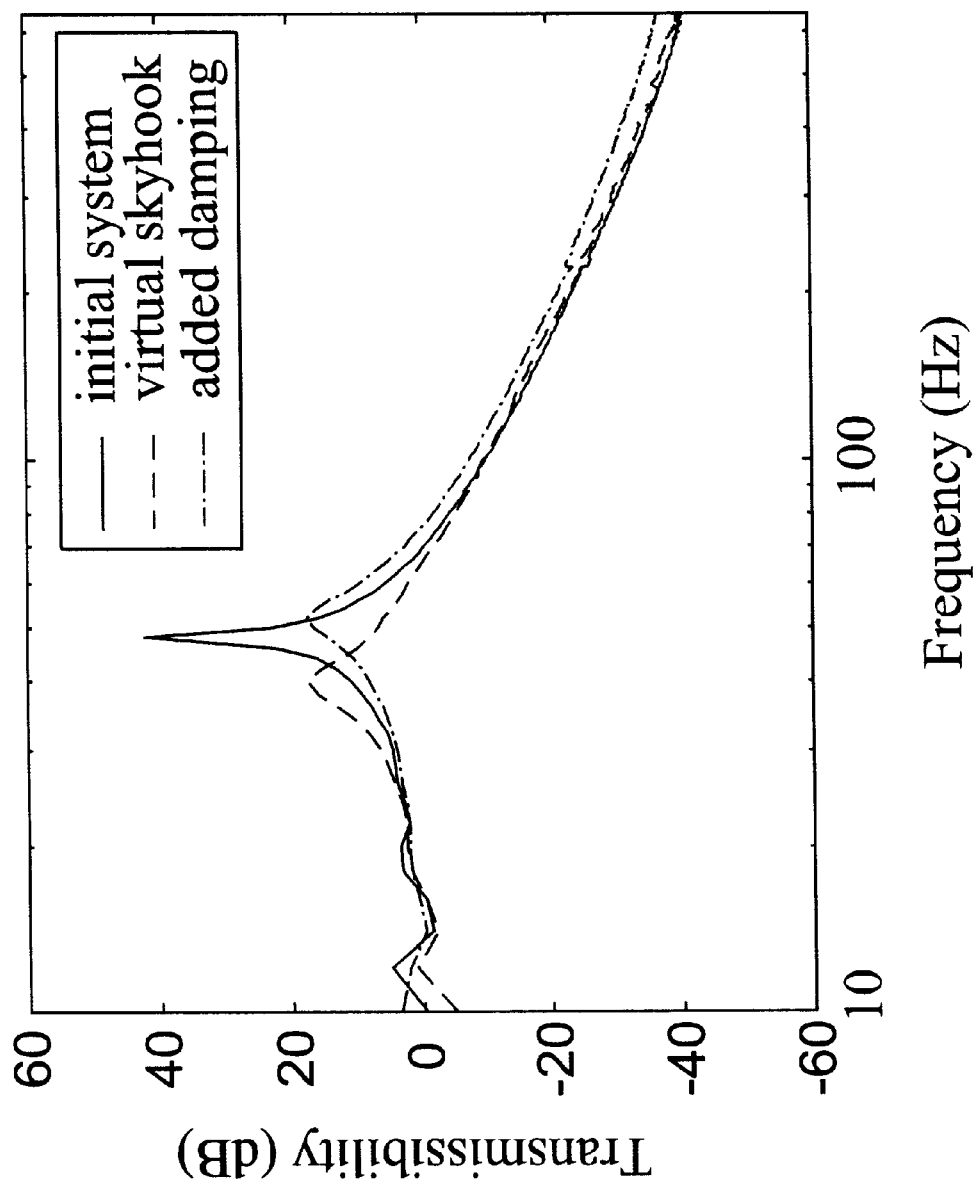
FIG. 6 is a graph of the measured transmissibility of the test system.

The transmissibility between the base-plate and the primary mass with no isolation system was measured and is presented in FIG. 6. This shows the lightly damped behavior of the titanium spring suspension system. The response exhibited high transmissibility at resonance and good roll-off above resonance as expected. The transmissibility using the virtual skyhook isolation assembly is also plotted in FIG. 6. This measurement indicates that the transmissibility was greatly reduced at resonance by the isolation system, while the high frequency roll-off was equivalent to the initial lightly damped system. This demonstrates that the virtual skyhook damper performed as expected, providing attenuation at resonance without the penalty of increased transmissibility at high frequencies.

Figure 7:
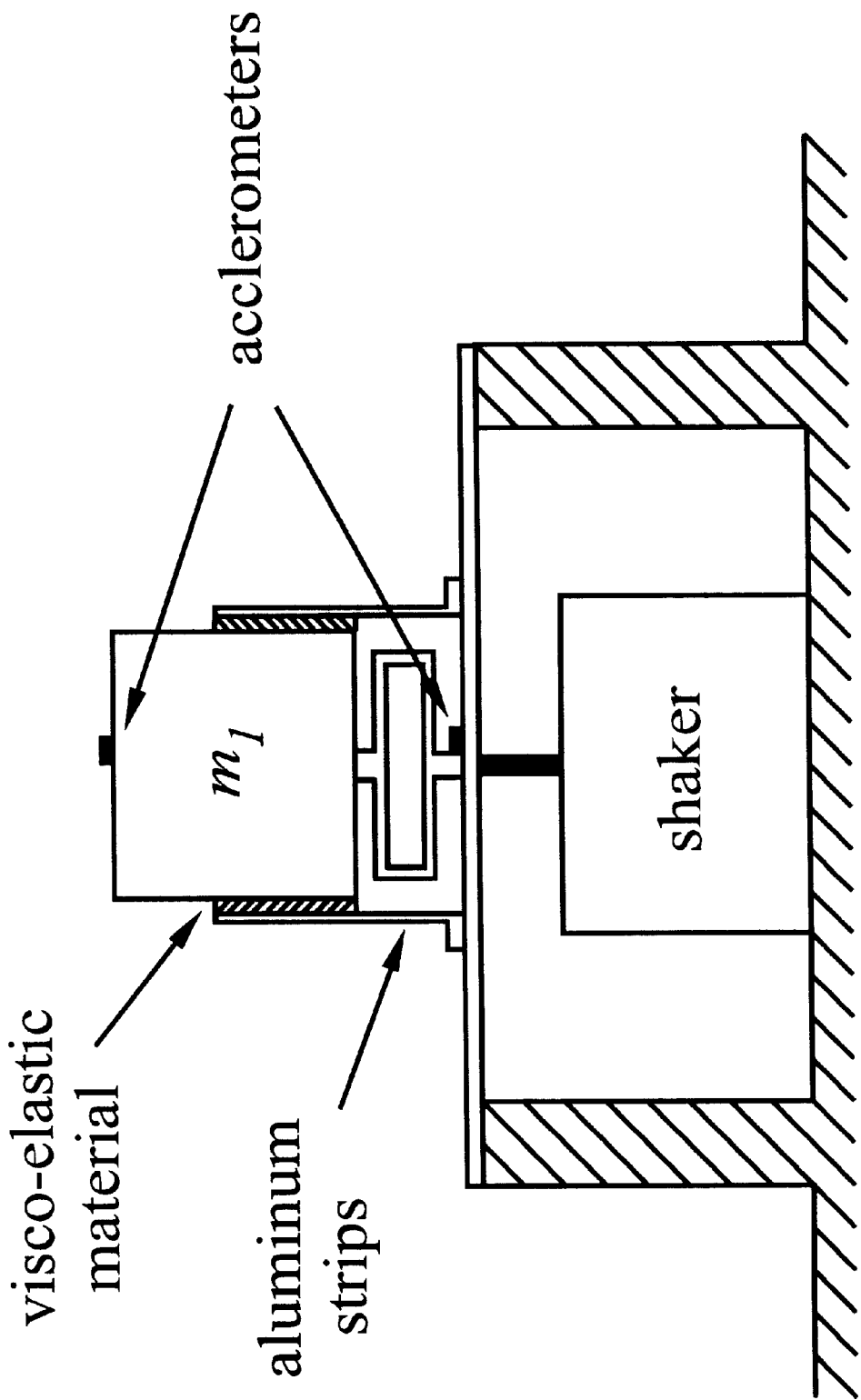
FIG. 7 shows the experimental setup for determining transmissibility using a heavily damped suspension.

For comparison, the performance of the virtual skyhook isolator was compared to the transmissibility resulting from using only the primary suspension system with increased damping. Damping was imparted to the primary mass using aluminum strips mounted to the base-plate and attached using visco-elastic material as shown in FIG. 7. Damping was increased until the level of attenuation achieved at resonance was comparable to the level achieved by the virtual skyhook damper. The resulting transmissibility is also plotted in FIG. 6, and indicates that to achieve a similar attenuation of the response at resonance using viscous damping, the high frequency transmissibility increases significantly (≈3 dB).

Figure 8:
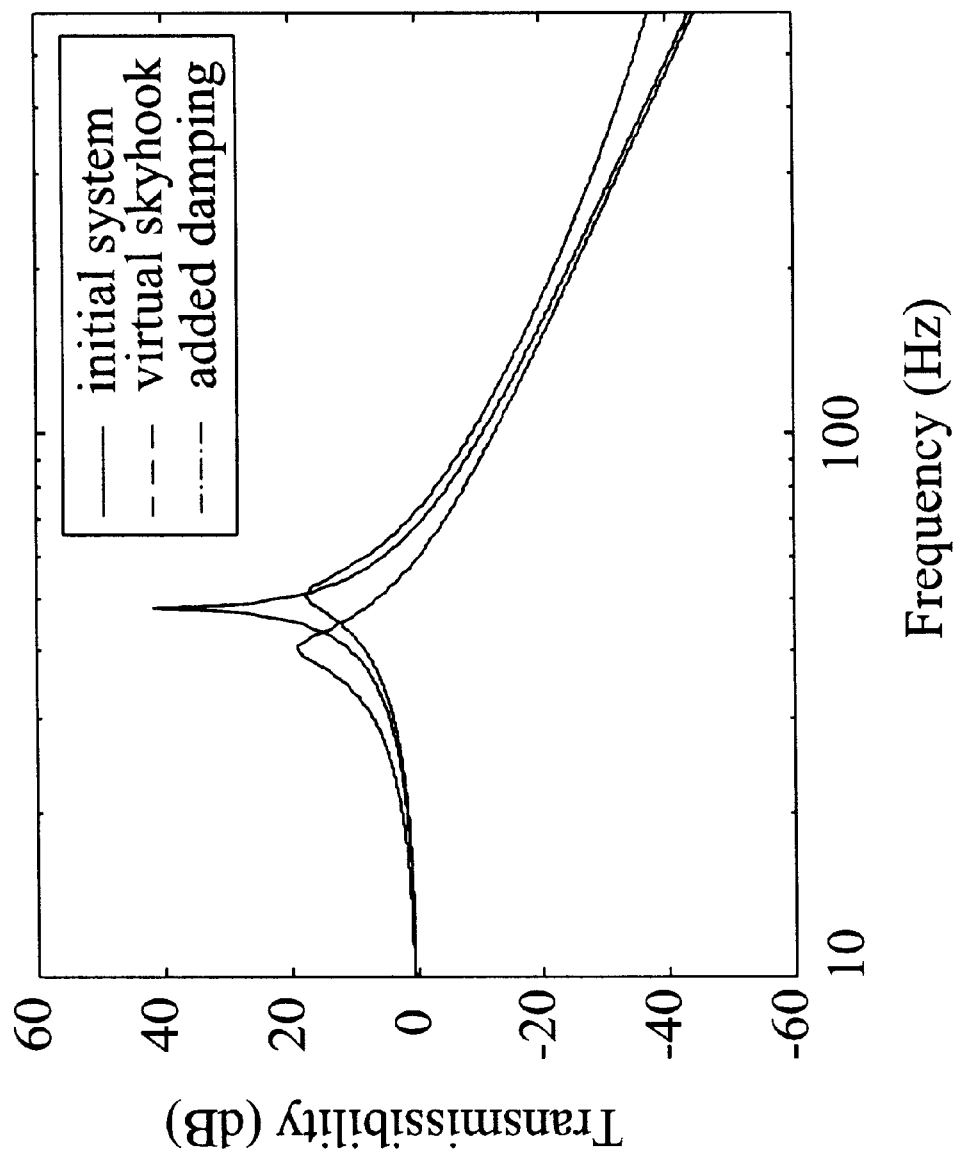
FIG. 8 is a plot of the model predictions of transmissibility for the experimental system.

The transmissibility curves predicted using Equation (7) are shown in FIG. 8. The plot indicated as "initial system" predicts the transmissibility without the virtual skyhook isolation system and was generated using the parameters in Table 1. The plot denoted as "virtual skyhook" predicts the transmissibility with the isolation system. The last plot predicts the performance of the system using the heavily damped setup shown in FIG. 7, where the damping ratio was modeled as $\zeta_1 = 0.68$, based on measurements. Comparing FIG. 6 and FIG. 8 indicates that the model agrees with the experiment and validates the model's ability to predict the performance of the virtual skyhook isolator.

The attenuation factor and high frequency reduction ratio were calculated using the model and demonstrate a tradespace for the design of a virtual skyhook damper. The data presented in Table 2 shows the performance of the virtual skyhook isolation system as a function of the mass ratio, $m_2/m_1$. In each case, the virtual skyhook isolation system was optimized to reduce transmissibility at resonance and high frequency. The data indicates that greater reductions in transmissibility at resonance and at higher frequencies can be achieved using a larger secondary mass. However, for a given mass ratio, the design can be optimized for reduction at resonance, high frequency reduction, or both depending on the desired design criteria.

TABLE 2

Performance of the virtual skyhook isolation system as a function of the mass ratio, $m_2/m_1$.

| Mass ratio, $m_2/m_1$ | Attenuation factor | High frequency reduction |
|---|---|---|
| .05 | 7.7 | .551 |
| .1 | 11.5 | .393 |
| .15 | 13.3 | .343 |
| .2 | 15.2 | .305 |
| .25 | 16.9 | .271 |

TABLE 2-continued

Performance of the virtual skyhook isolation system as a function of the mass ratio, $m_2/m_1$.

| Mass ratio, $m_2/m_1$ | Attenuation factor | High frequency reduction |
|---|---|---|
| .3 | 18.5 | .245 |
| .35 | 19.6 | .227 |
| .4 | 20.4 | .227 |
| .45 | 21.3 | .206 |
| .5 | 22.2 | .194 |

Figure 1:
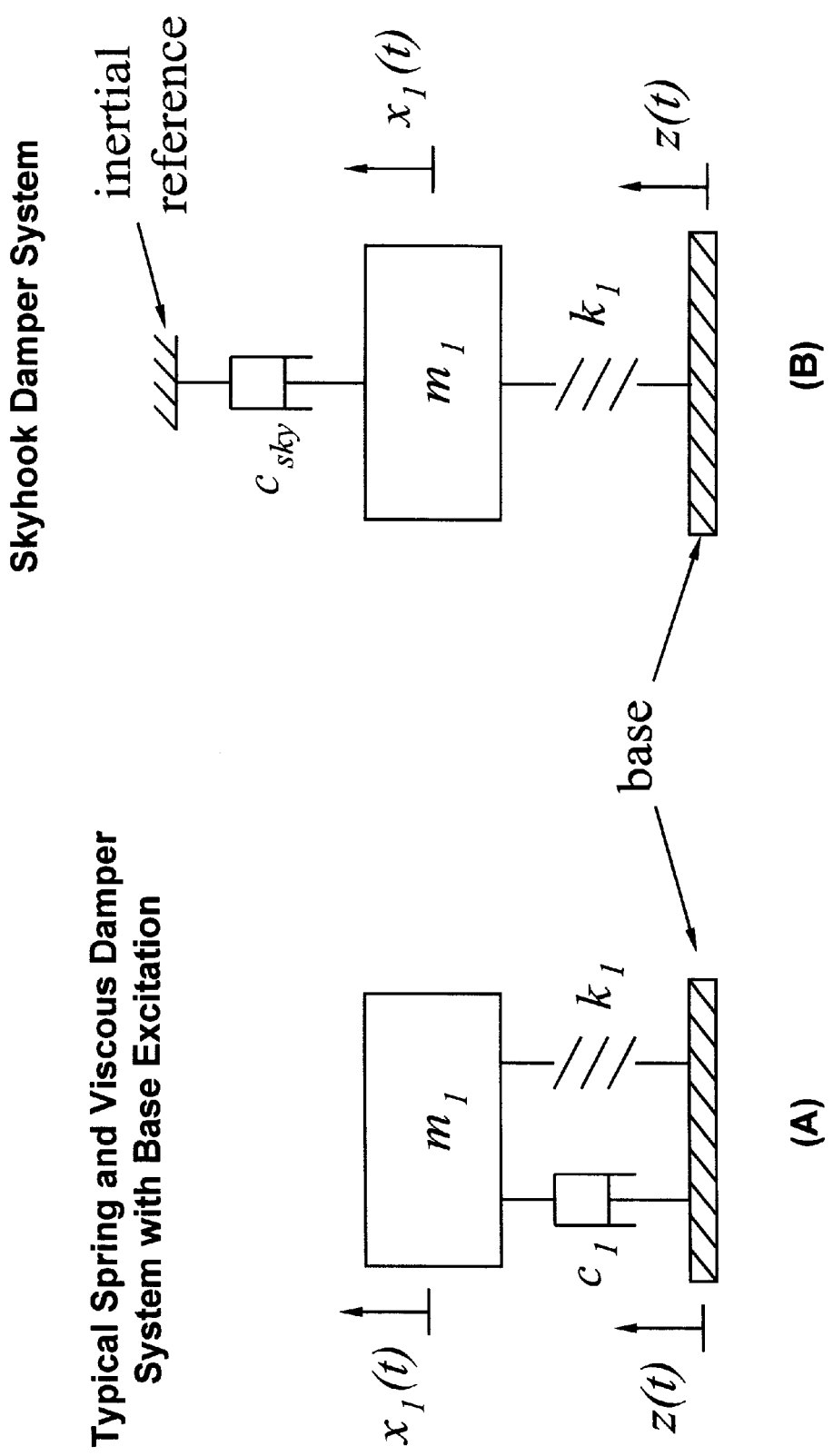
FIG. 1 shows (A) a single degree-of-freedom spring-mass-damper subjected to a base excitation, and (B) a system incorporating a damper attached to an inertial reference, i.e., a skyhook damper.
Figure 9:
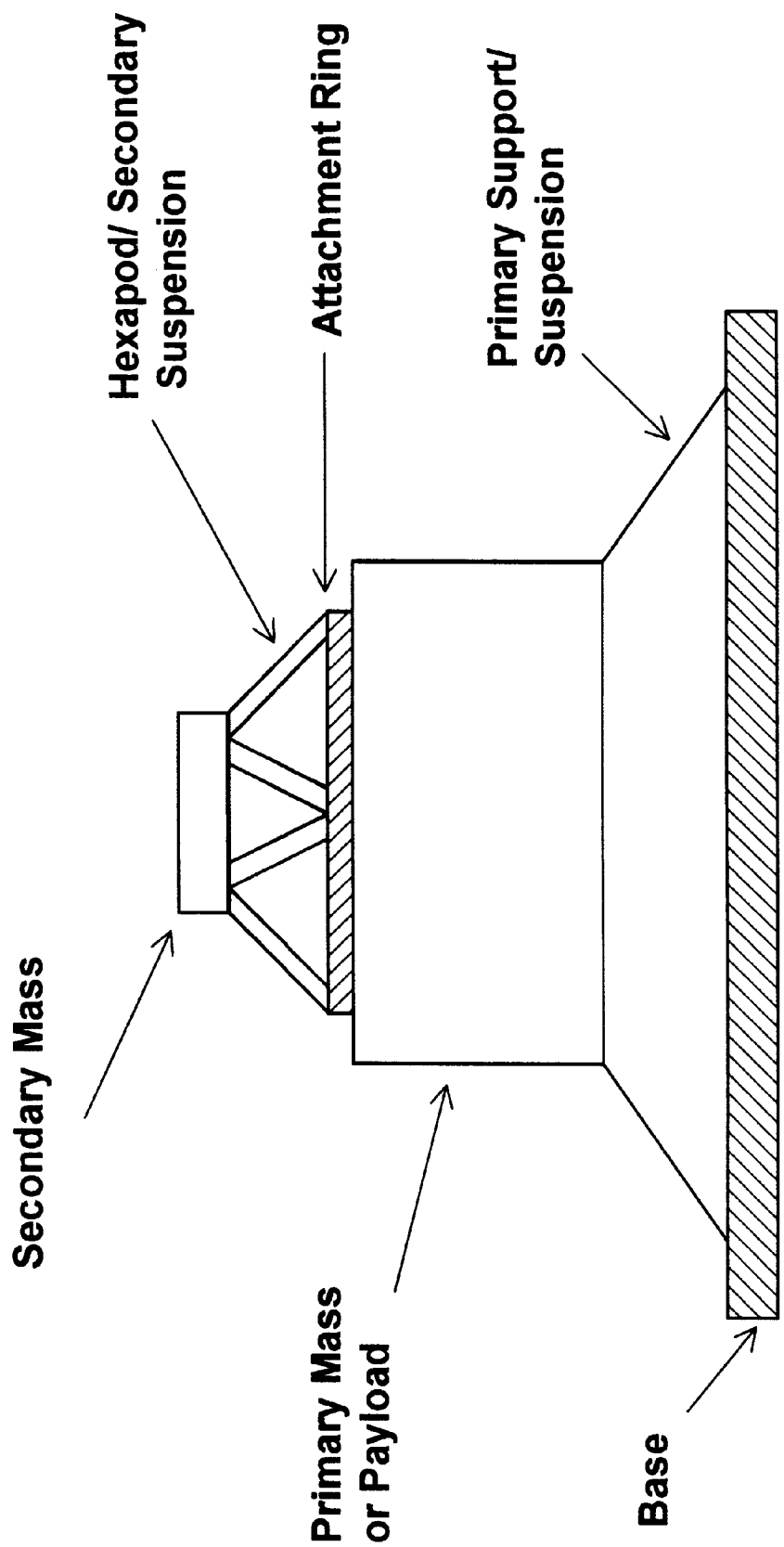
FIG. 9 is a second embodiment of the invention that incorporates both rotational and translational isolation in multiple directions using a hexapod type suspension.

The virtual skyhook vibration isolation system described for the single degree-of-freedom system shown in FIG. 1 can also be applied in other orientations in order to attenuate vibrations and disturbances in more than a single direction. By designing the secondary system with a hexapod suspension, for example, the isolation system can be used to attenuate the response of multiple modes (resonances) of the primary structure. An embodiment that incorporates both rotational and translational isolation in multiple directions using a hexapod type suspension is shown in FIG. 9. Since the hexapod suspension couples to rotation and translation in all three dimensions, the primary suspension and the secondary mass and suspension can be designed to attenuate disturbances, including moments, acting on the primary mass in any direction. In addition, the virtual skyhook isolation system can also be applied to reduce the transmission of disturbances in the form of torques or moments. Here, the translational suspension elements are exchanged or augmented with rotational and torsional elements.

We claim:

1. A passive virtual skyhook vibration isolation system for minimizing the transmission of external disturbances to a primary mass, said primary mass having a resonance frequency, said virtual skyhook system comprised of:

a. said primary mass connected to an external base by a primary suspension system comprised of a primary spring and a primary damping means through which external disturbances are transmitted, wherein said suspension system uses low damping to provide low transmissibility of external disturbances at high frequencies relative to said primary mass's resonant frequency; and b. a secondary mass connected to said primary mass by a secondary suspension system comprised of a secondary spring and a secondary damping means, wherein said secondary suspension is tuned approximately to said primary mass's resonant frequency, thereby providing a large damping contribution at resonance to said primary mass thereby limiting said primary mass motion at resonance while producing little damping contribution at frequencies above resonance, which maintains low transmissibility.

* * * * *